United States Patent [19]
Olsen et al.

[11] Patent Number: 5,695,241
[45] Date of Patent: Dec. 9, 1997

[54] ADJUSTABLE SEAT POST CLAMP ASSEMBLY FOR HUMAN-POWERED VEHICLES

[76] Inventors: Douglas G. Olsen, 3343 S. 825 East #B, Salt Lake City, Utah 84106; Daniel K. Buckmiller, 1792 E. Grover La., Salt Lake, Utah 84124

[21] Appl. No.: 526,703

[22] Filed: Sep. 8, 1995

[51] Int. Cl.⁶ .................... B60N 2/40; B62J 1/10
[52] U.S. Cl. ................ 297/195.1; 297/215.14; 297/207
[58] Field of Search .............. 297/195.1, 215.14, 297/207

[56] References Cited

U.S. PATENT DOCUMENTS

| | | | |
|---|---|---|---|
| 333,128 | 12/1885 | Jeffrey . | |
| 548,306 | 10/1895 | Eller . | |
| 549,466 | 11/1895 | Seaman . | |
| 551,016 | 12/1895 | Ward . | |
| 608,572 | 8/1898 | Bungay . | |
| 4,142,813 | 3/1979 | Laborde | 403/391 |
| 4,155,590 | 3/1979 | Cunningham | 297/195 |
| 4,231,611 | 11/1980 | Bird | 297/195 |
| 4,275,922 | 6/1981 | Jay | 297/215.14 |
| 4,421,357 | 12/1983 | Shimana | 297/215.14 |
| 4,440,440 | 4/1984 | Jay | 297/215.14 |
| 4,456,295 | 6/1984 | Francu | 297/211 |
| 4,483,334 | 11/1984 | Murray | 128/92 |
| 4,502,727 | 3/1985 | Holcomb et al. | 297/209 |
| 4,502,811 | 3/1985 | Patriarea | 292/215.14 X |
| 4,783,119 | 11/1988 | Moses | 297/195 |
| 4,789,172 | 12/1988 | Mueller | 280/281 R |
| 4,789,176 | 12/1988 | Carroll | 280/289 R |
| 4,807,856 | 2/1989 | Teckenbrock | 267/132 |
| 4,915,538 | 4/1990 | Golden et al. | 403/362 |
| 4,919,378 | 4/1990 | Iwasaki et al. | 248/295.1 |
| 4,983,063 | 1/1991 | Phillips | 403/4 |
| 4,987,764 | 1/1991 | Chen | 72/367 |
| 5,007,675 | 4/1991 | Musto et al. | 297/195 |
| 5,020,851 | 6/1991 | Chen | 297/195 |
| 5,033,790 | 7/1991 | Schilplin | 297/195 |
| 5,044,648 | 9/1991 | Knapp | 280/283 |
| 5,048,891 | 9/1991 | Yach | 297/195 |
| 5,123,698 | 6/1992 | Hodges | 297/201 |
| 5,149,034 | 9/1992 | Ganaja | 248/178 |
| 5,190,346 | 3/1993 | Ringle | 297/195 |
| 5,224,726 | 7/1993 | Gill | 280/287 |
| 5,226,624 | 7/1993 | Kingsbery | 248/219.2 |
| 5,228,796 | 7/1993 | Kao | 297/195.1 X |
| 5,236,169 | 8/1993 | Johnsen | 248/561 |
| 5,236,170 | 8/1993 | Johnsen | 248/578 |
| 5,240,219 | 8/1993 | Stouehouse | 248/409 |
| 5,244,301 | 9/1993 | Kurke | 403/390 |
| 5,294,173 | 3/1994 | Yu | 297/195.1 |
| 5,295,727 | 3/1994 | Kao | 297/215.14 |
| 5,297,846 | 3/1994 | Rafter | 297/195.12 |
| 5,301,974 | 4/1994 | Knapp | 280/283 |
| 5,330,283 | 7/1994 | Ballard | 403/97 |
| 5,362,127 | 11/1994 | Chang | 297/195.1 |
| 5,383,706 | 1/1995 | Chen | 292/195.1 X |
| 5,395,155 | 3/1995 | Yach | 297/215.14 |
| 5,397,094 | 3/1995 | Aoyama et al. | 248/598 |
| 5,443,301 | 8/1995 | Lai | 297/195.1 |
| 5,466,042 | 11/1995 | Herman | 297/195.1 X |
| 5,470,092 | 11/1995 | Fardy | 280/288 |
| 5,509,751 | 4/1996 | Keller | 403/325 |

*Primary Examiner*—Peter M. Cuomo
*Assistant Examiner*—Rodney B. White
*Attorney, Agent, or Firm*—Daniel P. McCarthy; Mark G. Sandbaken

[57] ABSTRACT

A bicycle seat post assembly including a seat post tube, a tube insert, a saddle, a top clamp, a bottom clamp and a fastener. The seat post assembly is centered with respect to the longitudinal axis of the seat post tube. The seat post assembly permit forward and rearward sliding adjustment of a seat, and angular adjustment of a seat with respect to the seat post tube. The seat post assembly accomodates assembly, disassembly and adjustment without the use of tools.

20 Claims, 7 Drawing Sheets

ADJUSTABLE SEAT POST CLAMP ASSEMBLY FOR HUMAN-POWERED VEHICLES

BACKGROUND OF THE INVENTION

A. Field of the Invention.

The invention relates to the field of seat posts and seat mounting clamps for bicycles and other human-powered vehicles. More specifically, the invention relates to the field of adjustable seat posts and seat mounting clamps for bicycles and other human-powered vehicles which can be readily adjusted without the use of tools.

B. Description of Related Art.

Cycle riding is becoming one of the most popular sporting activities. This pleasurable activity can be enjoyed by persons of all ages, from the very young to the elderly. As the popularity of this sport has increased, the varieties of cycles and cycling accessories available have also correspondingly increased. The types of cycles which are available include unicycles, bicycles, tricycles and multi-rider cycles (hereafter collectively referred to as "bicycles"). For the cycling enthusiast, bicycles are available for riding on roads, trails, hills and mountains. Bicycles have also been adapted for indoor use as exercise cycles.

As the popularity of bicycling has increased, manufacturers and riders alike have sought to make bicycles more comfortable to ride and more light-weight. One way in which manufacturers have improved the comfort of bicycle riding is to provide bicycle seats and seat posts which facilitate "micro-adjustment" of the seat position and angle to suit a particular rider.

Bicycle seats typically include truss structures to support the saddle. An example of such truss structure is disclosed in U.S. Pat. No. 5,294,173, which is incorporated by reference herein in its entirety. The typical truss structure used today is a shaped wire of appropriate thickness and strength to support the weight of a rider's body under expected riding conditions. The truss structure is the point at which typical bicycle seats are attached to the bicycle frame, via a bicycle seat post assembly.

There are bicycle seats in the prior art which include an angular adjustment mechanism on the seat frame. An example of such a bicycle seat is disclosed in U.S. Pat. No. 4,231,611, which is incorporated by reference herein in its entirety. Such a bicycle seat includes a seat clamp having a receptacle for receiving a support post. The clamp includes a clamp body which may be rotatably mounted to adjust the tilt or angular relationship between the seat and the post. The tilt of the seat post may be adjusted by loosening of a nut and bolt with a tool, adjusting the tilt of the seat and then tightening the nut and bolt combination. A disadvantage of this type of seat post clamp is that the clamp is offset with respect to the longitudinal axis of the seat post, and therefore requires extra reinforcement to strengthen the clamp, thereby adding extra weight to the clamp.

Bicycle seat post clamps have been designed which grip a seat truss structure in a clamp while allowing angular adjustment, and fore and aft adjustment, of the seat. Various seat post clamps are disclosed in U.S. Pat. Nos. 4,983,063, 4,987,764, 5,020,851, 5,123,698, 5,226,624, and 5,244,301. Each of these patents is incorporated by reference herein in its entirety. These seat post clamps typically have an angular adjustment mechanism offset from the longitudinal axis of the seat post. Because the angular adjustment mechanism is offset, the connection between the post and adjustment mechanism must be reinforced to support the weight of the rider. This results in a heavier seat post and creates stress points on the seat post. Another disadvantage of this type of mechanism is that adjustment of the seat angle requires the use of tools, which must be carried by the rider if the seat angle is to be adjusted while biking. This adds weight to the rider's gear and can result in inconvenience if a tool is not available for seat adjustment.

Seat post connector members have been designed which clamp both to a seat post and to a seat frame and allow angular adjustment of the bicycle seat. Such a device was disclosed in a U.S. Pat. No. 5,330,283, which is incorporated by reference herein in its entirety. The disadvantage of connector members is that, like the seat post clamps discussed above, they are offset with respect to the longitudinal axis of the seat post. These connectors are, therefore, as heavy or heavier than seat post clamps. They also require separate tools for angular adjustment of seat position.

Quick-release mechanisms have also been adapted for use with bicycle seat post to facilitate quick adjustment of he angle and position of bicycle seats. One such device is disclosed in U.S. Pat. No. 4,919,378, which is incorporated by reference herein in its entirety. This device uses a pair of seat posts which are adjustably fixed to each other. The relative adjustment of the seat posts is made by releasing the quick release mechanism, adjusting the seat position and then tightening the quick release mechanism.

U.S. Pat. Nos. 4,789,172, 4,789,176 and 5,224,726 disclose quick action saddle post clamps or assemblies which are designed to allow the height of a bicycle seat to be adjusted without the use of tools. U.S. Pat. No. 4,807,856 discloses an adjustable bicycle seat post with spring-biased mechanism for adjusting seat height. These devices do not, however, allow the seat angle or the fore-aft position to be adjusted.

A wedge-shaped seat post assembly is described in U.S. Pat. No. 5,033,790, in which a clamping member is formed of multiple wedge-shaped pieces atop a seat post. This patent is incorporated herein in its entirety. The clamping member allows angular and fore-aft adjustment of a bicycle seat. A bolt or other fastening member is used to pull the wedge-shaped pieces together, thereby clamping the seat truss shafts in place.

U.S. Pat. Nos. 5,048,891 and 5,395,155 each disclose a seat position changing apparatus in which the truss of the seat is fixedly secured to the top of a seat post. These patents are incorporated by reference in their entirety. A separate adjustment mechanism allows the seat angle and position to be adjusted. Adjustment may be controlled by a handlebar control.

U.S. Pat. No. 5,295,727 discloses a bicycle seat adjusting device allowing fore and aft adjustment, and angular adjustment, of a bicycle seat. This patent is incorporated by reference herein in its entirety. The bicycle seat post has a U-shaped support at the upper end of a seat post. A pair of horizontally oriented hexagonal bolts lock a pair of retainers in place. Adjustment is controlled by turning an adjusting lever to loosen hexagonal bolts, which allows the retainers to rotate, thereby allowing angular and fore-aft adjustment of the seat.

U.S. Pat. No. 4,783,119 discloses an adjustable saddle mount using separate angular and fore-aft adjustments. The angular adjustment mechanism includes a half spool shaped part which fits into a similarly shaped recess at the end of the seat post. A pair of bolts located outside the assembly secure the angular adjustment mechanism by gripping clamp bars located atop the assembly. The clamp bars also secure the truss structure of the seat. This patent teaches the use of a pair of fixing bolts with a wide spacing to allow the use of smaller, more light-weight fasteners.

U.S. Pat. No. 5,190,346 discloses an adjustable wrap-around bicycle seat post clamping apparatus using a single fastener. The clamping mechanism includes upper and lower rail clamping means. The upper rail clamping means has an arcuate surface to facilitate adjustable attachment with the seat post clamping apparatus. The lower rail clamping apparatus also has an arcuate surface corresponding to the arcuate upper surface of the upper end of the seat post. The seat post clamping apparatus includes a hole means extending horizontally through the upper end of the seat post tube, a rod means extending through the hole means, and a wrap around member which covers the upper rail clamping means. The wrap around member is held in place by a detachable securement means engaging the rod means and the wrap around member. The securement means is located on the outside of the apparatus. A disadvantage of this apparatus is that the hole mean, which extends through the end of the seat post tube, weakens the seat post tube. The securement means requires a tool to allow adjustment of the angle and fore-aft position of the seat.

U.S. Pat. Nos. 5,007,675 and 5,149,034 disclose seat adjustment devices which are controlled by a handle mounted release lever. Both of these devices also use multiple posts to position the seat, and thus, like the device of Iwasaki and Akamatsu, are heavy and require strengthened joints because the adjustment mechanism is offset from the longitudinal axis of the seat post tube.

Suspension devices have also been developed for use with bicycle seats and seat post. Such devices are disclosed in U.S. Pat. Nos. 4,456,295, 5,044,648, 5,301,974, 5,236,169, 5,236,170 and 5,397,094, each of which is incorporated by reference herein in its entirety. Most of these devices are suitable for combination with other mechanisms which allow adjustment of the height, angle or fore-aft position of a bicycle seat.

There is a need for a light-weight seat post clamp which allows adjustment of the angle and fore-aft position of a bicycle seat without the use of separate tools and which include a bicycle seat attachment mechanism that is not offset with the longitudinal axis of the seat post in order to maximize assembly strength and minimize component weight.

II. SUMMARY OF THE INVENTION

It is an object of the invention to provide an adjustable seat post clamp for bicycles and other human powered vehicles. It is a feature of the invention that the adjustable seat post clamp may be adapted to fit a variety of bicycle frames and the frames of other human powered vehicles. It is an advantage of the invention that the adjustable seat post assembly may also be used with vehicles such as human-powered vehicles including unicycles, bicycles, tricycles, multi-person cycles, and motorized vehicles including mopeds, scooters, and motorcycles.

It is an object of the invention to provide a light-weight seat post clamp which is easy to adjust and which allows nearly infinite adjustment of the angle and fore-aft position of a seat. It is a feature of the invention that the angle and position of the seat mounted to the seat post clamp may be readily adjusted by a rider. It is an advantage of the invention that the angle and position of a seat mounted to the seat post clamp assembly may be readily adjusted without the use of tools.

It is an object of the invention to provide a seat post clamp which is strong and light-weight. It is a feature of the invention that the seat post clamp eliminates stress points by substantially aligning its components along the longitudinal axis of the assembly. It is an advantage of the invention that the seat post clamp is stronger and lighter than other seat post assemblies by using high-strength, light-weight materials and requiring fewer components.

It is an object of the invention to provide a seat post clamp which is readily adapted to fit different size bike seat post tubes. It is a feature of the invention that the seat post clamp may include a variety of sleeves, each sleeve being designed to fit a different size seat post tube. It is an advantage of the invention that a sleeve may be made of inexpensive, light-weight material. It is a further advantage of the invention that by using different sleeves, a rider may use the same seat and seat post clamp assembly on a variety of bicycles with different seat tube inner diameters.

It is an object of the invention to provide a bicycle seat post assembly which provides seat post position adjustment without the use of tools. It is a feature of the invention that a bicycle seat attached to the invented seat post assembly serves as a point of leverage to tighten or loosen the fastening mechanism of the seat post assembly. It is an advantage of the invention that the user of the invented seat post assembly does not need to carry tools in order to be prepared to perform seat post assembly adjustment.

It is an object of the invention to provide a bicycle seat post assembly which orients the attachment of the bicycle seat truss structure along the longitudinal axis of the bicycle seat post, rather than offsetting the attachment of the seat truss structure from the longitudinal axis of the bicycle seat post. It is a feature of the invention that orientation of the bicycle seat post assembly along the longitudinal axis of the bicycle seat post, rather than offsetting it, maximizes component strength and minimizes component size and weight. It is an advantage of the invention that a strong, light and compact bicycle seat post assembly results.

These and other objects, features and advantages of the invention will be clear to a person of ordinary skill in the art upon reading this specification in light of the appended drawings.

III. BRIEF DESCRIPTION OF THE DRAWINGS

IV. DETAILED DESCRIPTION OF A PREFERRED EMBODIMENT

Figure 1:
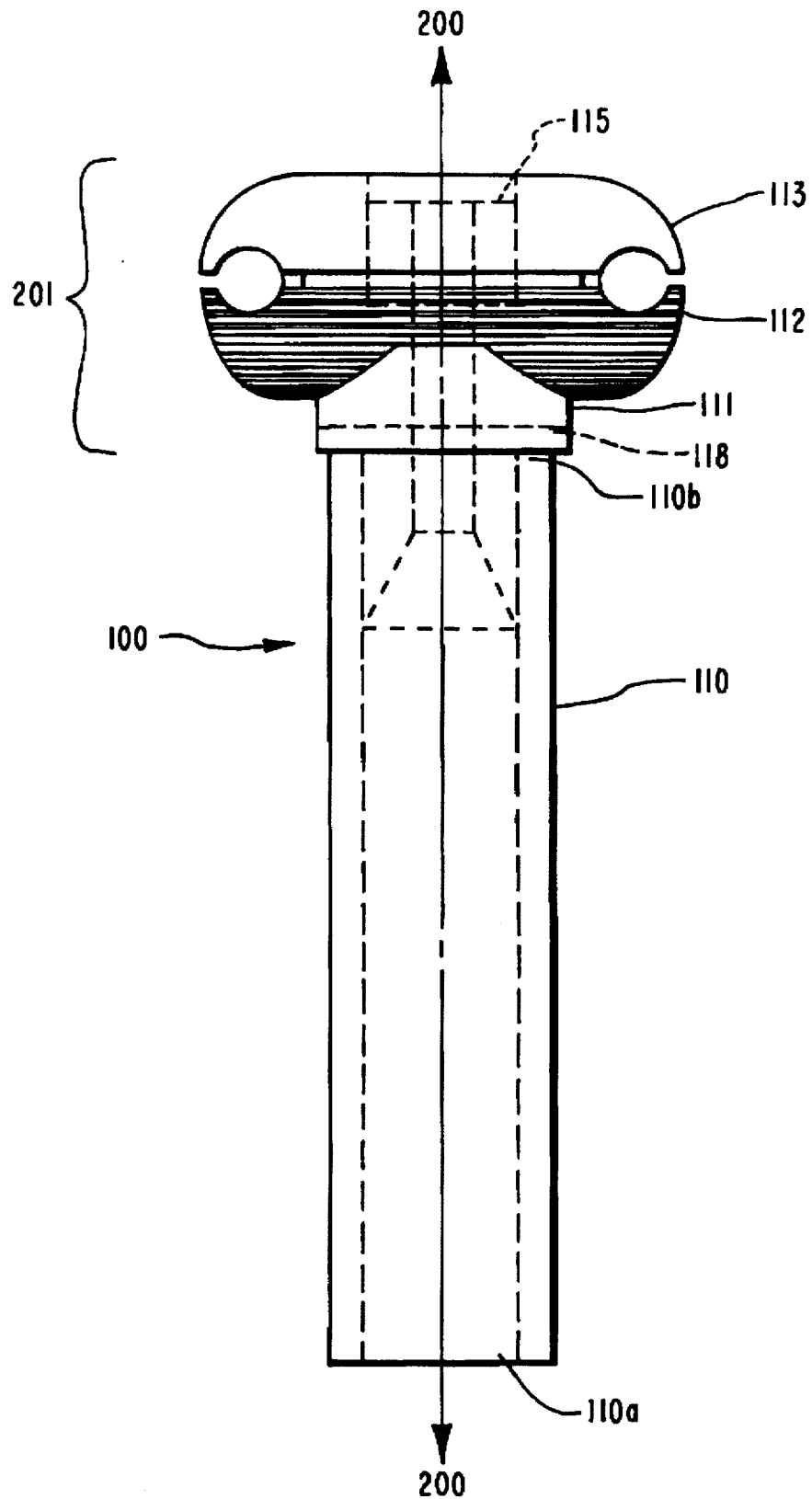
FIG. 1 depicts an assembled front view of one preferred embodiment of the invented seat post assembly.

Referring to FIGS. 1, a front view of the invented seat post clamp assembly can be seen. Assembly 100 includes seat post tube 110, which has a frame insertion end 110a adapted to be installed into a receptacle in a bicycle frame, and a seat post assembly joining end 110b, adapted to have bicycle seat post assembly components mounted to it. A longitudinal axis 200 extends between the ends 110a and 110b of seat post tube 110.

The seat post tube 110 may be made from any strong, lightweight material including, but not limited to, composite materials (which include any resin or plastic with reinforcing fibers, whether made by filament winding, injection molding, lay-up, or other processes), aluminum, plastic, steel, alloys, titanium and other metals and materials. If the seat post tube 110 is a composite tube manufactured by filament winding, which is preferred, then suitable fibers will include, but are not limited to, fiberglass (including E glass and S glass), graphite, boron, Kevlar (generically referred to as aromatic polyamide), nylon, polyester, polyethylene, ceramic, silicon carbide and others. Suitable resins will include, but are not limited to, thermosets (epoxy, vinylester, polyester, phenolics and others), thermoplastics (NYLON, generically referred to as a polyamide, polypropylene, polyurethane, polyethylene and others), metal matrix, and ceramic matrices. In the preferred embodiment of the invention, tube 110 is manufactured from a fiber-resin composite. In the most preferred embodiment of the invention, seat post tube 110 is manufactured by filament winding using graphite and epoxy.

Figure 2:
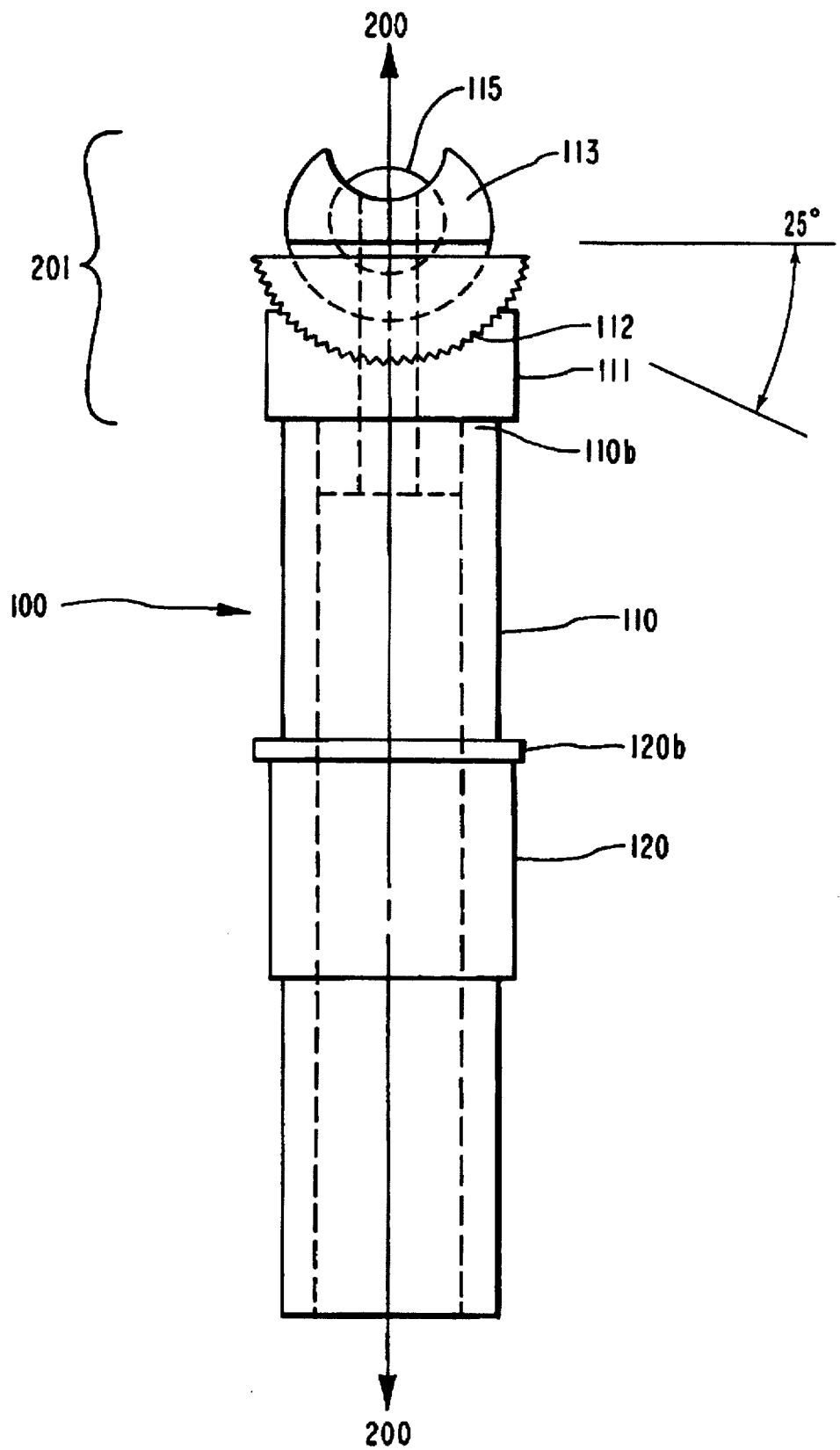
FIG. 2 depicts an assembled side view of one preferred embodiment of the invented seat post assembly.
Figure 3:
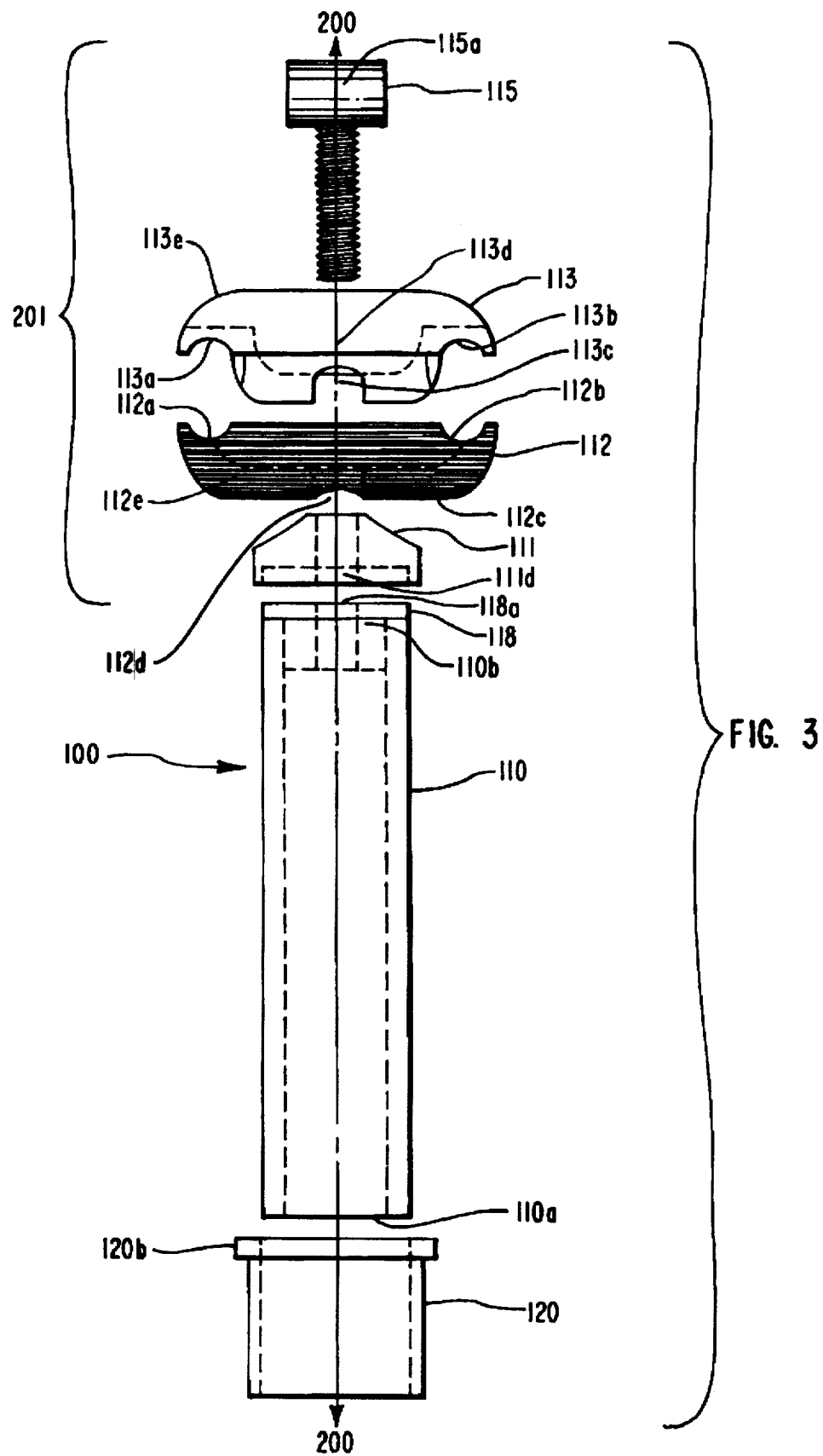
FIG. 3 depicts an unassembled front view of one preferred embodiment of the invented seat post assembly.
Figure 4:
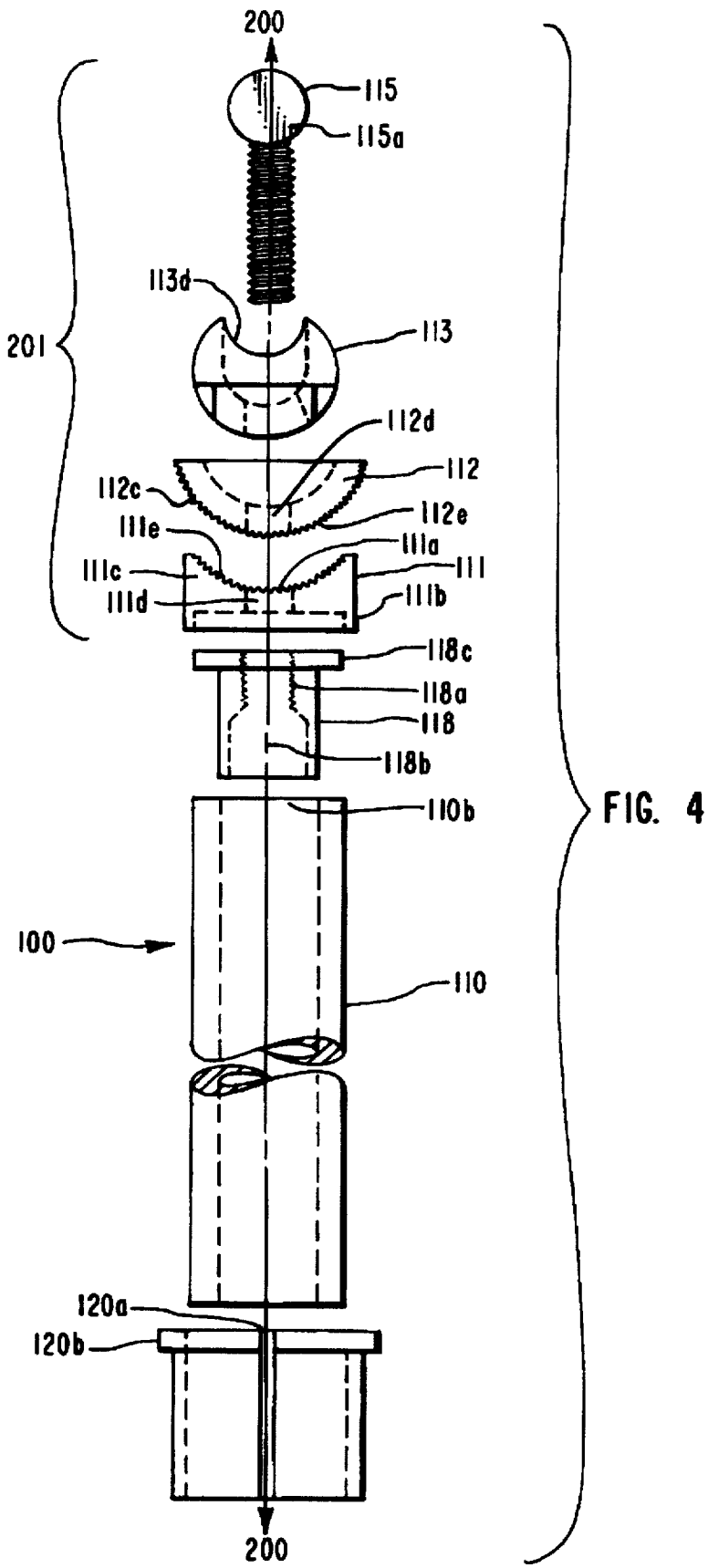
FIG. 4 depicts an unassembled side view of one preferred embodiment of the invented seat post assembly.

The cross-sectional shape of tube 110 may be selected in accordance with the desired use of seat post clamp assembly 100. In one preferred embodiment on the invention, the cross-sectional shape of seat post tube 110 is circular on both its interior and exterior. The cross-sectional shape of tube 110 may also be non-circular, according to its desired use, and may include shapes such as ellipsoidal, square, rectangular, triangular, and higher order polygonal shapes. In the most preferred embodiment of the invention, seat post tube 110 has a circular cross-sectional shape with an outside diameter of about one (1) inch and is hollow. It should be noted that seat tubes 110 that are solid, include lattice structure, are honey-combed, are foam filled, or have interiors of other configuration may be used. The seat post tube 110 is considered a universal seat post tube because in the preferred embodiment of the invention for which a side assembled view is provided in FIG. 2, a seat post sleeve 120 is provided of appropriate diameter to cause the seat post tube 110 to fit into a receptacle in a bicycle frame that is of larger diameter than the seat tube 110. Seat tube insert 120 fits between the outside surface of tube 110 and the inner surface of the seat tube (seat post receptacle) on a bicycle frame. In a preferred embodiment of the invention, seat post sleeve 120 has a vertical slit 120a (shown in FIG. 4), which allows sleeve 120 to more easily conform to slight variations in outside surface of tube 110. It is also possible to provide a seat post sleeve 120 that is tapered from top to bottom in order to cause it to fit into a variety of frame receptacles.

Seat post sleeve 120 is slidingly adjustable along tube 110 so as to allow the height of a seat held by the seat post assembly to be adjusted. In a more preferred embodiment of the invention, to provide secure mechanical engagement between the inside surface sleeve 120 and the outside surface of tube 110, both surfaces may be roughened to contain ridges, grooves, splines, dimples or protrusions which allow the inside surface of sleeve 120 to mechanically engage the outside surface of tube 110 when sleeve 120 is compressed against the outside surface of tube 110, thereby preventing tube 110 from sliding through sleeve 120 when downward force is applied to the top of seat post clamp assembly 100. It is also possible to adhesively connect (such as by use of glue or epoxy) or to integrally connect (such as by welding) seat post tube 110 and sleeve 120. As depicted in the figures, the seat post sleeve 120 has a rim or lip 120b which is adapted to rest against the edge of a bicycle frame into which the seat post tube 110 is mounted. This prevents loss of the sleeve 120 into the bicycle frame.

Seat post sleeve 120 may be made of any suitable resilient material including, but not limited to, plastic, metal, composites and others. In the preferred embodiment of the invention, seat post sleeve 110 is manufactured from DELRIN (generically referred to as acetals).

Seat post assembly joining end 110b of tube 110 is preferably adapted to receive a seat post assembly fastening mechanism. In one embodiment of the invention, seat post assembly joining end 110b has a threaded aperture, parallel to the z-axis, for receiving a threaded bolt or screw 115. In a preferred embodiment of the invention, the threaded aperture may further comprise a helicoil to strengthen threaded aperture and to provide a tighter fit for bolt or screw 115. In another embodiment of the invention, top end 110b has an unthreaded aperture, parallel to the z-axis, for receiving a ball and socket assembly that mounts the remaining components of the seat post assembly to the seat post assembly joining end 110b. In the most preferred embodiment of the invention, a post insert 118 is mounted into the hollow end of seat post assembly joining end 110b by use of glue or epoxy. Other mounting methods may be used, such as mechanical fasteners, friction fitting, or otherwise. The post insert 118 has an outside diameter that approximates the inside diameter of the seat post tube 110b for a good fit. The post insert 118 has a receptacle 118a which is preferably threaded in order to permit mounting thereto of other seat post assembly components. The post insert 118 is of ample height to remain fixed in the seat post tube 110 without twisting or pivoting while undergoing the various types of torque to be encountered during cycling. In order to minimize weight in view of this ample height, the post insert bottom 118 is hollow. The post insert 118 has a rim or lip 118c to permit the post insert 118 to rest firmly against the seat post tube 110 while a rider's weight is applied to it. The post insert 118 is preferably made from aluminum with a steel helicoil insert for accepting a steel bolt, but can be constructed from any suitable steel, composite, plastic, alloy, or other material.

The portion of the seat post assembly 100 which affixes a bicycle seat (preferably via the seat's truss structure) to the seat post assembly joining end 110a is referred to herein as the bicycle seat mount 201. In a preferred embodiment of the invention, the bicycle seat mount 201 firmly but adjustably mounts a bicycle seat to the joining end 110b by using a saddle 111, a bottom clamp 112, a top clamp 113 and a bolt 115. It can be seen in the figures that the bottom of the saddle 111 is adapted to abut the joining end 110b, including abutting the post insert 118 if a post insert 118 is included. If a post insert 118 is included, it is preferred that the saddle 111 bottom be recessed so that the post insert 118 can protrude into, or nest with, the bottom of the saddle 111. A front view of the saddle 111 (see FIG. 4) shows that it has a depressed center 111a with raised sides 111b and 111c. This configuration is referred to herein as a "saddle shape." The preferred saddle 111 also has an aperture 111d through which a mounting bolt may be inserted to affix the saddle 111 to the joining end 110b or the post insert 118. Located somewhere between the raised sides 111b and 111c of the saddle 111, it is preferred to have a surface with a mechanical engagement mechanism 111e, such as knurling, grooves, splines, dimples or protrusions in order to positively mechanically engage with the clamping mechanism that will be described below at a desired seat angle.

The bicycle seat mount 201 also includes a bottom clamp 112 and a top clamp 113. The bottom clamp 112 has an underside 112c which has a mechanical engagement mechanism 112e, such as knurling, grooves, splines, dimples or protrusions in order to engage with the mechanical engagement mechanism 111e of the saddle 111 when the mount 201 is assembled. The bottom clamp 112 and top clamp 113 each have a right and a left truss receptacle 112a, 113a, 112b and 113b which serve to hold a seat in a desired position with respect to the seat post assembly when the mount 201 is assembled. The top clamp 113 and bottom clamp also each have a receptacle 113c and 112d respectively through their respective centers to accomodate a fastener 115 such as a bolt or threaded rod which serves to assemble and tighten all of the bicycle seat post assembly components into a single unit. The fastener 115 protrudes through the top clamp 113, through the bottom clamp 112, through the saddle 111 and into the post insert 118. If the fastener 115 is threaded, it will engage with thread in the post insert 118 in order to tighten the mount 201 to cause top clamp 113 to be held tightly against bottom clamp 112 so that receptacles 112a, 113a, 112b and 113b are brought together to exert a clamping force on a seat truss structure to be held by them. Tightening of the fastener 115 also forces the mechanical engagement mechanism 112e of the bottom clamp 112 to engage with the mechanical engagement mechanism 111e of the saddle 111 in order to fix the mount 201 and a seat held by the mount 201 in a desired angle with respect to the bicycle seat post tube 110.

The top 113e of top clamp 113 in the preferred embodiment has an elongate receptacle 113d to receive and accomodate the shape of the desired fastener head 115a. As the desired fastener 115 is a T-bolt which has a head 115a which has a greater measurement along one axis perpendicular to its longitudinal axis than along the other axis perpendicular to its longitudinal axis, the use of a similar-shaped elongate receptacle 113d permits the bolt head 115a to fit into the top of top clamp 113. Assembled in this fashion, the user will then find that by turning a bicycle seat whose truss structure is held by the clamp 112 and 113, the truss structure exerts a force on the receptacles 112a, 113a, 112b and 113b, and that this force is transferred through top clamp 113 to the fastener 115 through the receptacle 113d to the rod head 115a, causing the rod 115 to be threaded into or out of the threads in the post insert 118. By thus turning the bicycle seat clockwise or counter-clockwise, a user may either tighten or loosen the seat post assembly without the use of traditional tools such as an allen wrench. This permits convenient assembly and adjustment of the invented seat post assembly without the use of any tool.

It is also of note that the preferred seat post assembly as shown in the various figures, the mount 201 and its various components are centered on the longitudinal axis 200 of the seat post 110. In the prior art, it was typical to offset any mount assembly used from the longitudinal axis of the seat post in order to provide access for tools used for assembly and adjustment. In the invention, however, as tools are not needed for assembly or adjustment as described above, it is preferable to align or center the entire mount 201 along the longitudinal axis 200. This results in a stronger mount 201 because less torque is exerted on the various components than would be exerted if they were offset some distance from the longitudinal axis 200. It also permits size and weight of the components of the mount 200 to be minimized while maintaining a strong and durable assembly.

Figure 5:
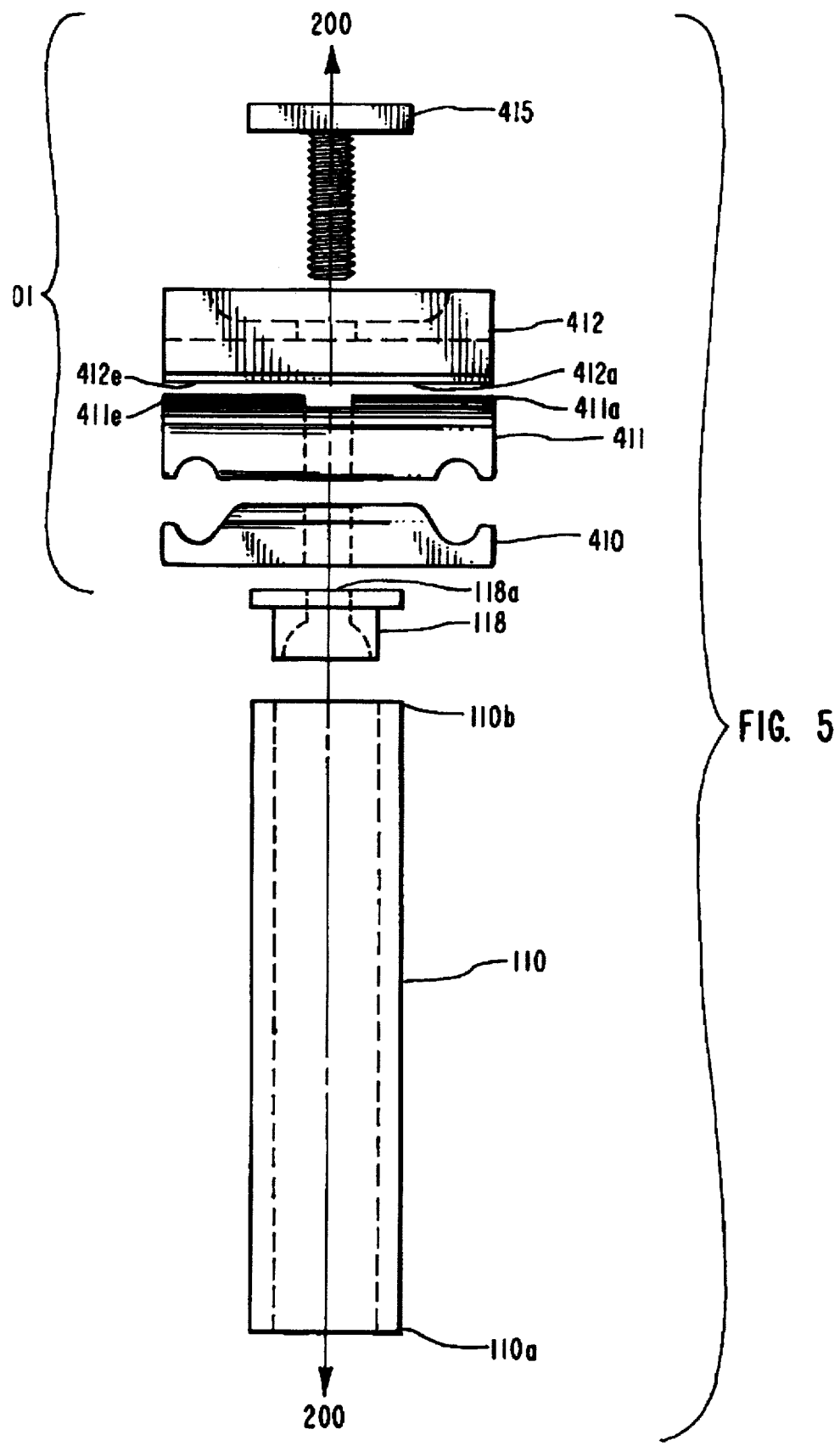
FIG. 5 depicts an unassembled front view of another embodiment of the seat post assembly.
Figure 6:
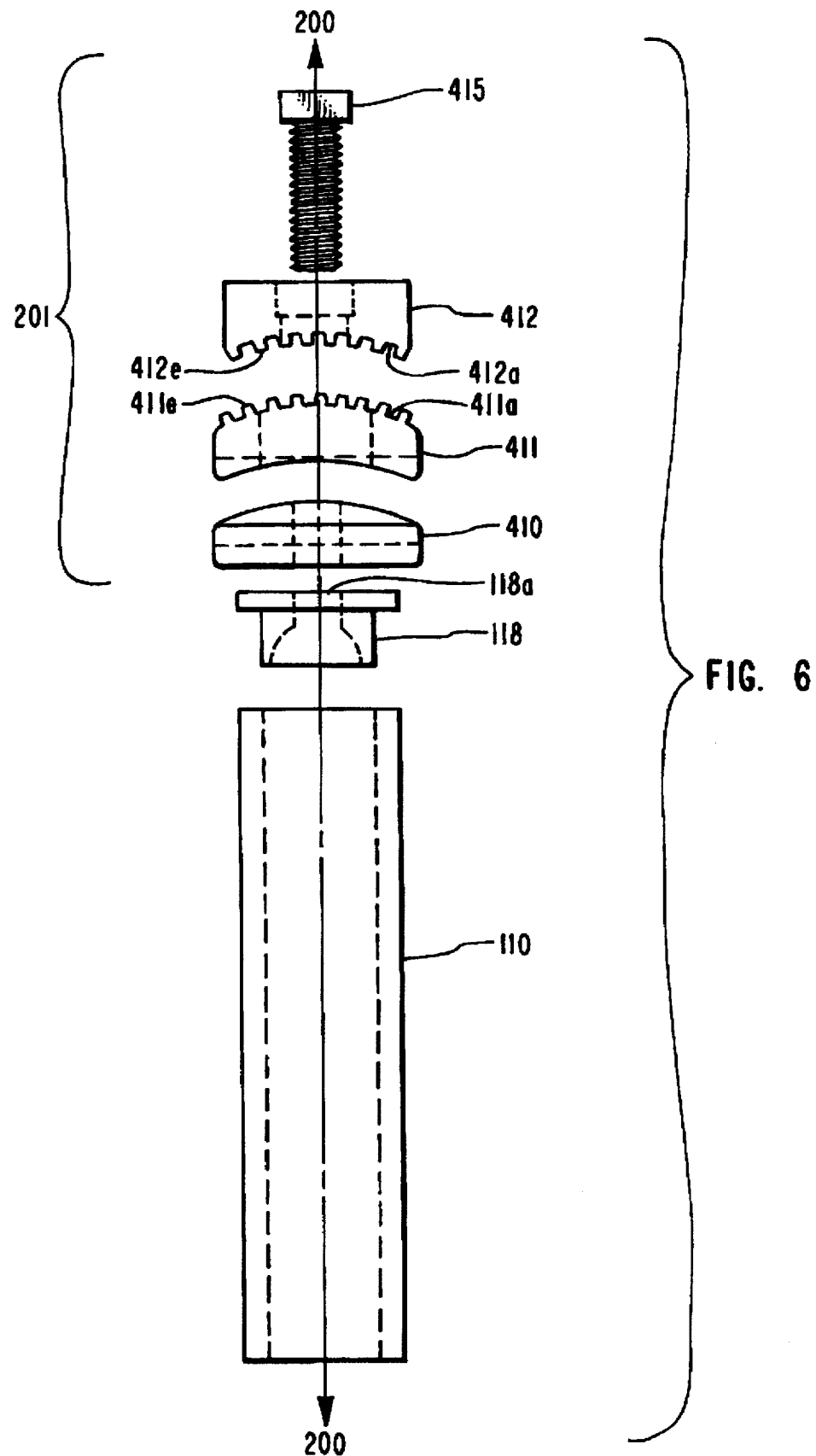
FIG. 6 depicts an unassembled side view of another embodiment of the seat post assembly.

Referring to FIGS. 5 and 6, an alternative embodiment of the invention are shown with an exploded front view provided in FIG. 5 and an exploded side view provided in FIG. 6. The alternative embodiment includes a seat post tube 110, a post insert 118 installable into the joining end 110b of tube 110, a bottom clamp 410, a top clamp 411, a saddle 412 and a fastener 415. Note that the top of the top 411a of the top clamp 411 and the bottom 412a of the saddle 412 include mechanical engagement means 412e (such as grooves, knurling, splines, dimples or protrusions) in order to engage and lock with each other. The saddle 412 in this embodiment has a concavity on its underside where the mechanical engagement mechanism 412e is located, and the top clamp 411 is convex on its upper side in order to properly fit with the concavity of the saddle. The top of the saddle 412 includes a receptacle for the fastener 415. Assembly and adjustment of this embodiment is accomplished as already discussed above, without the use of tools. Note that the entirety of the components of the seat post assembly of FIGS. 5 and 6 are centered with respect to the longitudinal axis of the seat post 110 rather than being offset from it, thus providing the benefits described above.

Figure 7:
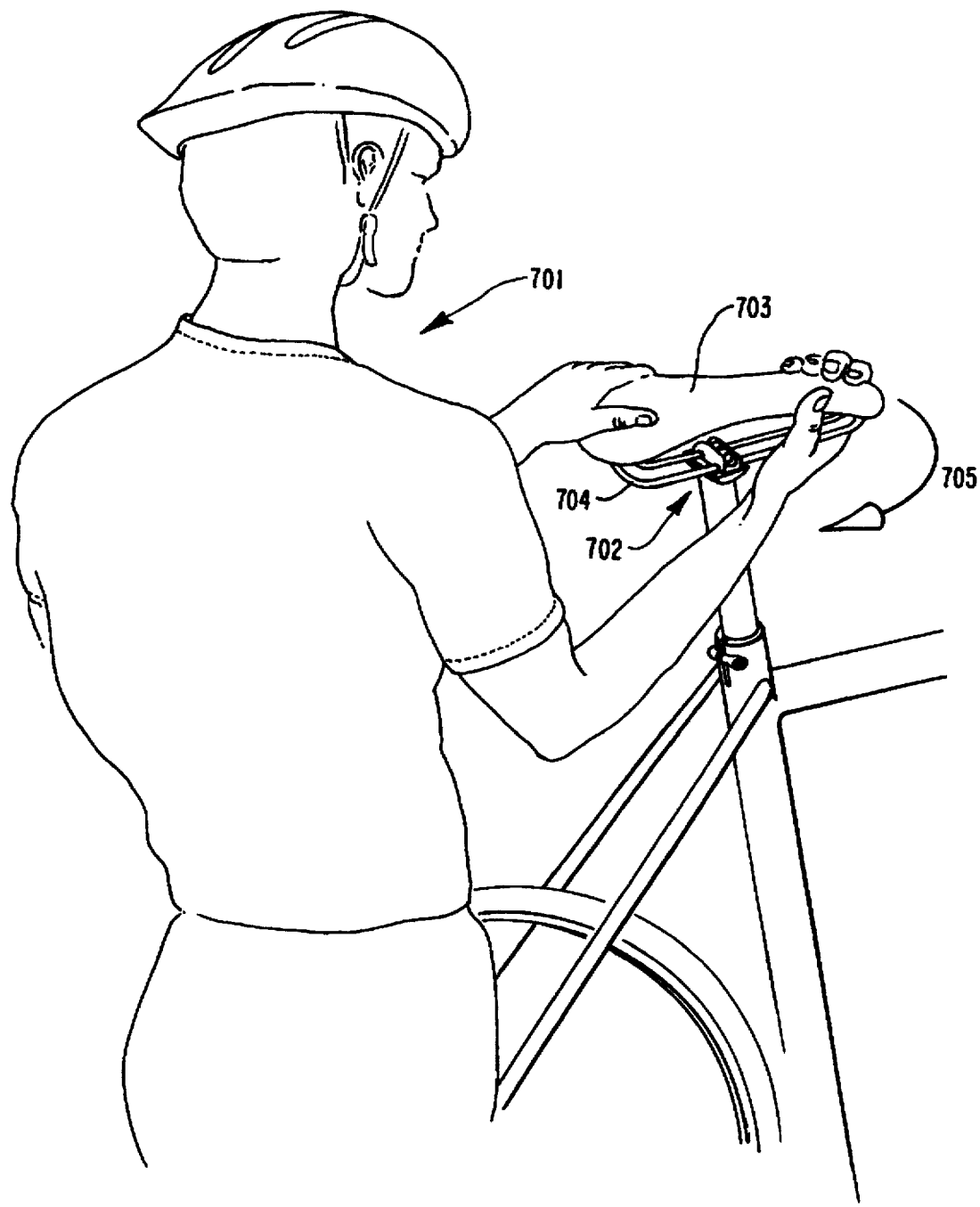
FIG. 7 depicts a rider tightening the invented seat post clamp assembly simply by rotating the bicycle seat without the use of any tools.

FIG. 7 depicts a rider tightening the invented seat post clamp assembly simply by rotating the bicycle seat without the use of any tools.

Referring to FIG. 7, a cycle rider 701 can be seen adjusting his seat position and angle by using the invented bicycle seat post assembly 702. The rider can slide his seat 703 fore and aft within the provided receptacles of the top and bottom clamp that are designed to clamp to the seat truss structure 704. This permits the rider to select a seating position that will comfortably locate the rider's hips with respect to pedal and handlebar position. The rider can also angle his seat forward or backward, as desired, by adjusting the clamps 112 and 113 with respect to the stationary saddle 111 and seat post 110. For example, referring to FIG. 5, the rider may select a forward bucketing angle for his seat by rotating the clamps 112 and 113 toward the left side of the page. Of course, the entire mount 201 and seat post assembly remains centered along the longitudinal axis 200 of the seat post 110, but a seat held by the assembly would be angled downward in front. Alternatively, the rider may select a rearward bucketing angle for his seat by rotating clamps 112 and 113 toward the right side of the page. The seat will remain fixed at the angle selected by the rider because of the use of the mechanical engagement mechanism of the clamp and saddle. Again referring to FIG. 7, if the rider 701 rotates the bicycle seat 703 in the direction of arrow 705, then the rider 701 will tighten the seat clamp assembly 702 for riding. If the rider 701 rotates the bicycle seat 703 in the direction opposite the arrow 705, then the rider 701 will loosen the seat clamp assembly 702 for adjustment or disassembly.

The various components of the mount 201 and the post insert 118 are preferably manufactured from 7075, 6061 or 7048 aluminum. Other types of aluminum, steel, alloys, titanium, composites, plastics or other materials may be used to manufacture the invented components. Manufacturing methods which may be employed to make the invented components include machining, extruding, casting, injection molding, filament winding, fiber lay-up, and others.

While the present invention has been described and illustrated in conjunction with a number of specific embodiments, those skilled in the art will appreciate that variations and modifications may be made without departing from the principles of the invention as herein illustrated, described and claimed. The present invention may be embodied in other specific forms without departing from its spirit or essential characteristics. The described embodiments are to be considered in all respects as only illustrative, and not restrictive. The scope of the invention is, therefore, indicated by the appended claims, rather than by the foregoing description. All changes which come within the meaning and range of equivalency of the claims are to be embraced within their scope.

We claim:

1. An adjustable seat post assembly comprising:

(a) a seat post tube having a frame insertion end and a mounting end, said frame insertion end being insertable into a bicycle frame, and said mounting end having a receptacle, (b) a post insert having a first and a second end, said post insert first end being installable into said mounting end receptacle of said seat post tube, said second end having a threaded receptacle for receiving a fastener, (c) a saddle having a top and a bottom, said saddle bottom abutting said post insert second end, said saddle top being concave and having a mechanical engagement mechanism within said concave area, and said saddle having an aperture for projection of a fastener therethrough, (d) a bottom clamp having a top and a bottom, said bottom clamp bottom being convex in shape and having a mechanical engagement mechanism within said convex area to facilitate positive locking with said mechanical engagement mechanism of said saddle top, said bottom clamp top having truss receptacles to receive a seat truss structure, and said bottom clamp having an aperture for projection of a fastener therethrough, (e) a top clamp having a top and a bottom, said top clamp bottom abutting said bottom clamp top, said top clamp bottom having truss receptacles to receive a seat truss structure and to clamp the truss structure against said bottom clamp truss structure receptacles, said top clamp having an aperture for projection of a fastener therethrough, said top clamp further having an elongate receptacle transverse to and adjoining said top clamp aperture, said elongate receptacle adapted to receive a fastener head, and (f) a fastener comprising a threaded T-bolt having a head, said fastener projecting through said apertures of said top clamp, said bottom clamp and said saddle, and engaging said threaded receptacle of said seat post insert, said head of said T-bolt disposed in said top clamp elongate receptacle;

wherein rotating said T-bolt in a first direction in said post insert receptacle causes tightening of said saddle, bottom clamp and top clamp between said T-bolt head and said post insert; and wherein rotating said T-bolt in a second direction in said post insert receptacle causes loosening of said saddle, bottom clamp and top clamp between said T-bolt head and said post insert.

2. An adjustable seat post assembly as recited in claim 1 wherein said post insert, said saddle, said bottom clamp, said top clamp and said fastener are centered with respect to the longitudinal axis of the seat post tube.

3. An adjustable seat post assembly as recited in claim 1, wherein said apertures in said saddle, said bottom clamp, and said top clamp are centered with respect to the longitudinal axis of said seat post tube.

4. An adjustable seat post assembly as recited in claim 1 further comprising a bicycle seat having a truss structure attached to said seat post assembly so that the truss structure is held by said top clamp and bottom clamp truss structure receptacles.

5. An adjustable seat post assembly as recited in claim 4 wherein rotation of the bicycle seat with respect to the longitudinal axis of said seat post tube causes a force to be exerted on said top clamp and said bottom clamp truss structure receptacles which in turn causes said top clamp and said bottom clamp to rotate;

wherein rotation of said top clamp exerts a force on said fastener head, which causes said fastener to rotate; and wherein rotation of the bicycle seat with respect to the longitudinal axis of said seat post tube effects tightening or loosening of the seat post assembly without the use of separate tools.

6. A seat post assembly as recited in claim 1 wherein said saddle bottom is recessed to permit protrusion of said post insert therein in order to achieve firm engagement between said saddle and said post insert.

7. A seat post assembly as recited in claim 1 wherein said bottom of said top clamp is convex, wherein said top of said bottom clamp is concave and receives said bottom of said top clamp.

8. An adjustable seat post assembly comprising:

(a) a seat post tube having a frame insertion end and a mounting end, said frame insertion end adapted to be inserted into a bicycle frame, and said mounting end having a receptacle, (b) a post insert having a first and a second end, said post insert first end installed in said mounting end receptacle of said seat post tube, said post insert having a fastener receptacle on its second end for receiving a fastener, (c) a saddle having a top and a bottom, said saddle bottom abutting said post insert second end, said saddle top being concave and having a mechanical engagement mechanism within said concave area, and said saddle having an aperture for projection of a fastener therethrough, (d) a bottom clamp having a top and a bottom, said bottom clamp bottom being convex in shape and having a mechanical engagement mechanism within said convex area to facilitate positive locking with said mechanical engagement mechanism of said saddle top, said bottom clamp top having truss receptacles adapted to receive a seat truss structure, and said bottom clamp having an aperture for projection of a fastener therethrough, (e) a top clamp having a top and a bottom, said top clamp bottom abutting said bottom clamp top, said top clamp bottom having truss receptacles to receive a seat truss structure and to clamp the truss structure against said bottom clamp truss structure receptacles, said top clamp having an aperture for projection of a fastener therethrough, and said top clamp further having an elongate receptacle transverse to and adjoining said top clamp aperture, said elongate receptacle being adapted to receive a fastener head, and (f) a fastener having a head, said fastener projecting through said top clamp aperture, through said bottom clamp aperture, through said saddle aperture, and engaging said seat post insert fastener receptacle in order to assemble said top clamp, said bottom clamp, said saddle, and said seat post insert together;

wherein rotation of said top clamp with respect to the longitudinal axis of said seat post tube causes rotation of said fastener in the same direction.

9. An adjustable seat post assembly as recited in claim 8 wherein a bicycle seat having a truss structure may be assembled with the seat post assembly so that the truss structure is held by said top clamp and bottom clamp truss structure receptacles.

10. An adjustable seat post assembly as recited in claim 9 wherein rotation of the bicycle seat with respect to the longitudinal axis of said seat post tube causes a force to be exerted on said top clamp and said bottom clamp truss structure receptacles which in turn causes said top clamp and said bottom clamp to rotate;

wherein rotation of said top clamp causes a force to be exerted on said fastener head causing said fastener to rotate; and wherein rotation of the bicycle seat with respect to the longitudinal axis of the seat post tube effects tightening or loosening of the seat post assembly without the use of separate tools.

11. A seat post assembly as recited in claim 8 wherein said fastener consists of a single bolt which serves to assemble, tighten and retain said top clamp, said bottom clamp, said saddle and said post insert in said seat post assembly.

12. A seat post assembly as recited in claim 8 wherein said saddle bottom is recessed to permit protrusion of said post insert therein in order to achieve firm engagement between said saddle and said post insert.

13. A seat post assembly as recited in claim 8 wherein said bottom of said top clamp is convex, wherein said top of said bottom clamp is concave and adapted to receive said bottom of said top clamp.

14. An adjustable seat post assembly comprising:

(a) a seat post tube having a frame insertion end adapted to be inserted into a bicycle frame, and a mounting end adapted to receive a fastener, (b) a saddle having a top and a bottom, said saddle bottom abutting said seat post tube mounting end, said saddle top being concave and having a mechanical engagement mechanism within said concave area, and said saddle having an aperture to accommodate projection of a fastener therethrough, (c) a bottom clamp having a top and a bottom, said bottom clamp bottom being convex in shape and having a mechanical engagement mechanism within said convex area to facilitate positive locking with said mechanical engagement mechanism of said saddle top, said bottom clamp top having truss receptacles adapted to receive a seat truss structure, and said bottom clamp having an aperture to accommodate projection of a fastener therethrough, (d) a top clamp having a top and a bottom, said top clamp bottom abutting said bottom clamp top, said top clamp bottom having truss receptacles adapted to receive a seat truss structure and to clamp the truss structure against said bottom clamp truss structure receptacles, said top clamp having an aperture to accommodate projection of a fastener therethrough, said top clamp further having an elongate receptacle transverse to and adjoining said top clamp aperture, said elongate receptacle adapted to receive a fastener head, and (e) a fastener having a head, said fastener adapted to project through said apertures of said top clamp, said bottom clamp and said saddle, and engaging said mounting end of said seat post tube in order to assemble said top clamp, said bottom clamp, said saddle, and said seat post tube together;

wherein a bicycle seat having a truss structure may be assembled with the seat post assembly so that the truss structure is held by said top clamp and bottom clamp truss structure receptacles;

wherein rotation of the bicycle seat with respect to the longitudinal axis of said seat post tube causes a force to be exerted on said top clamp and said bottom clamp truss structure receptacles which in turn causes said top clamp and said bottom clamp to rotate;

wherein rotation of said top clamp causes a force to be exerted on said fastener head causing it to rotate; and wherein rotation of the bicycle seat with respect to the longitudinal axis of the seat post tube effects tightening or loosening of the seat post assembly without the use of separate tools.

15. A seat post assembly as recited in claim 14 wherein said fastener consists of a single bolt which serves to assemble, tighten and retain said top clamp, said bottom clamp, said saddle and said post tube in a seat post assembly.

16. A seat post assembly as recited in claim 14 wherein said saddle bottom is recessed to permit protrusion of said post insert therein in order to achieve firm engagement between said saddle and said post insert.

17. A seat post assembly as recited in claim 14 wherein said bottom of said top clamp is convex, wherein said top of said bottom clamp is concave and adapted to receive said bottom of said top clamp.

18. An adjustable seat post assembly comprising:

(a) a seat post tube having a frame insertion end adapted to be inserted into a bicycle frame, and a mounting end adapted to have a bicycle seat mounted to it, (b) a post insert having a first and a second end, said post insert first end being installable into a receptacle in said mounting end of said seat post tube, said second end having a fastener receptacle for receiving a fastener, (c) a bottom clamp having a top and a bottom, said bottom clamp bottom abutting said second end of said post insert, and said bottom clamp top having a receptacle for receiving and holding a seat truss structure, (d) a top clamp having a top and a bottom, said top clamp bottom having a receptacle for receiving and holding a seat truss structure, said top clamp bottom abutting said bottom clamp top, (e) a saddle having a top and a bottom, said saddle bottom being configured to abut said top clamp top and permit pivotal adjustment of said top clamp top with respect to the longitudinal axis of the seat post tube, and (f) a fastener having a head, said fastener securing said saddle, said top clamp, and said bottom clamp with respect to said seat post tube;

wherein said post insert, said saddle, said bottom clamp, said top clamp and said fastener are centered with respect to the longitudinal axis of the seat post tube.

wherein a bicycle seat having a truss structure may be assembled with the seat post assembly so that the truss structure is held by said top clamp and bottom clamp truss structure receptacles;

wherein rotation of the bicycle seat with respect to the longitudinal axis of said seat post tube causes a force to be exerted on said top clamp and said bottom clamp truss structure receptacles which in turn causes said top clamp and said bottom clamp to rotate;

wherein rotation of said top clamp causes a force to be exerted on said fastener head, causing said fastener to rotate; and wherein rotation of the bicycle seat with respect to the longitudinal axis of the seat post tube effects tightening or loosening of the seat post assembly without the use of separate tools.

19. An adjustable seat post assembly as recited in claim 18 wherein rotating said fastener in a first direction in said post insert receptacle causes tightening of said saddle, bottom clamp and top clamp between said fastener and said post insert; and wherein rotating said fastener in a second direction in said post insert receptacle causes loosening of said saddle, bottom clamp and top clamp between said fastener head and said post insert.

20. A seat post assembly as recited in claim 18 wherein said bottom of said top clamp is convex, wherein said top of said bottom clamp is concave and adapted to receive said bottom of said top clamp.

* * * * *